United States Patent
Uhl et al.

(10) Patent No.: US 7,458,153 B2
(45) Date of Patent: Dec. 2, 2008

(54) METHOD FOR MAKING A CYLINDER FOR A TWO-STROKE ENGINE

(75) Inventors: Klaus-Martin Uhl, Baltmannsweiler (DE); Helmar Amend, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 591 days.

(21) Appl. No.: 10/864,347

(22) Filed: Jun. 10, 2004

(65) Prior Publication Data

US 2004/0250420 A1  Dec. 16, 2004

(30) Foreign Application Priority Data

Jun. 11, 2003  (DE) ............................... 103 26 207

(51) Int. Cl.
*B23P 11/00* (2006.01)
*F02B 33/00* (2006.01)

(52) U.S. Cl. ............................... 29/888.06; 29/888.061; 29/888.01; 29/527.6; 29/557; 123/74 R

(58) Field of Classification Search .............. 29/888.06, 29/888.061, 888.01, 527.6, 557; 123/74 R
See application file for complete search history.

(56) References Cited

U.S. PATENT DOCUMENTS

| 3,351,044 | A | * | 11/1967 | Wood ....................... 123/41.28 |
| 3,448,505 | A | * | 6/1969 | Castelet ................... 29/888.06 |
| 3,844,334 | A | * | 10/1974 | Frederickson ............... 164/132 |
| 4,306,522 | A |   | 12/1981 | Fotsch |
| 5,025,760 | A | * | 6/1991 | Webb et al. ............... 123/73 PP |
| 6,041,499 | A | * | 3/2000 | Matsuura et al. .......... 29/888.06 |
| 6,345,439 | B2 | * | 2/2002 | Matuura et al. ........... 29/888.06 |
| 6,491,005 | B2 | * | 12/2002 | Bergmann et al. ........ 123/73 R |
| 6,729,274 | B2 | * | 5/2004 | Matuura et al. ............. 123/65 P |
| 6,842,979 | B2 | * | 1/2005 | Klaric et al. ........... 29/888.061 |
| 6,886,520 | B2 | * | 5/2005 | Nozaki et al. ............. 123/193.2 |
| 7,066,120 | B2 | * | 6/2006 | Geyer et al. ............. 123/195 C |
| 7,159,314 | B2 | * | 1/2007 | Brokel et al. ............. 29/888.06 |
| 2004/0098860 | A1 | * | 5/2004 | Britt et al. ................. 29/888.06 |

* cited by examiner

*Primary Examiner*—Essama Omgba
(74) *Attorney, Agent, or Firm*—Walter Ottesen

(57) ABSTRACT

At least one transfer channel (9, 29) is formed in the cylinder wall (4, 24) of the cylinder (1, 21) for a two-stroke engine. The transfer channel (9, 29) is closed to the cylinder outer side (5, 25) by a cover (10, 30). The method for making the cylinder (1, 21) provides that the cover (10, 30) is assembled in a first step on the cylinder (1, 21) and, in a second step, the cylinder bore (3, 23) is machined.

6 Claims, 1 Drawing Sheet

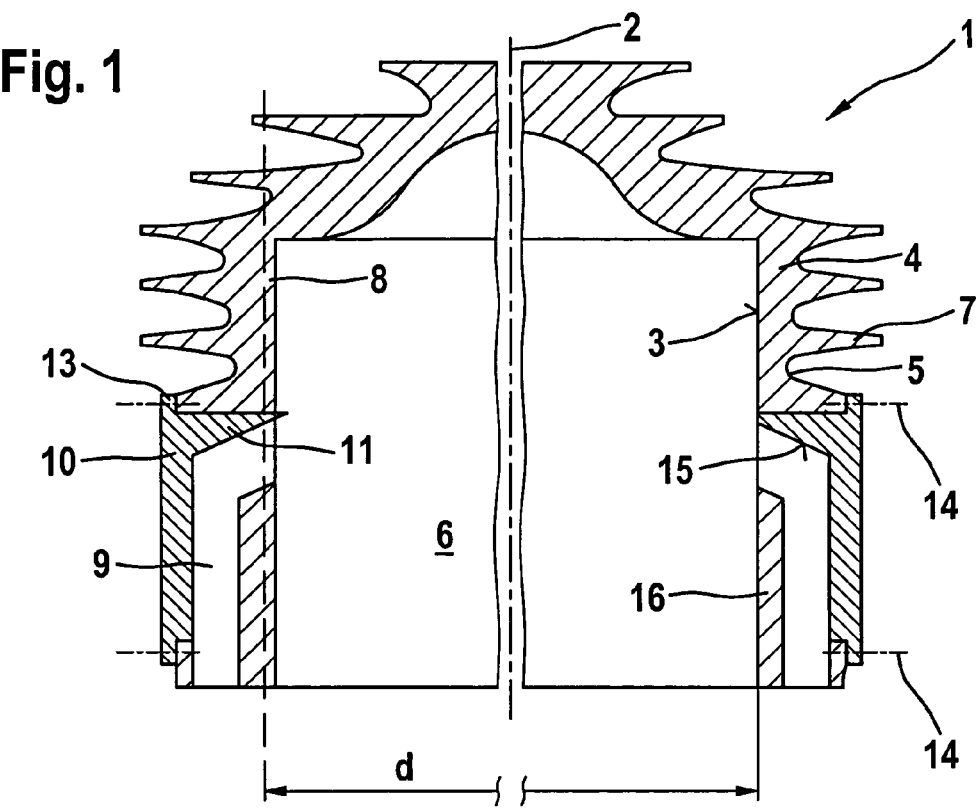
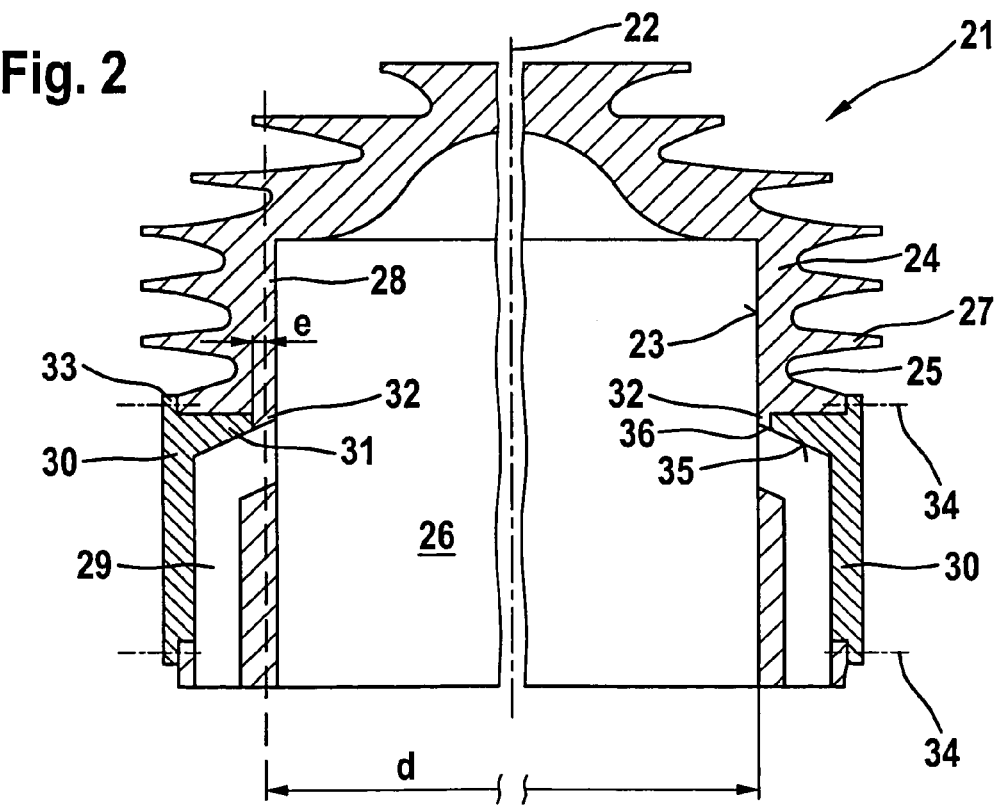

METHOD FOR MAKING A CYLINDER FOR A TWO-STROKE ENGINE

CROSS REFERENCE TO RELATED APPLICATION

This application claims priority of German patent application no. 103 26 207.5, filed Jun. 11, 2003, the entire content of which is incorporated herein by reference.

BACKGROUND OF THE INVENTION

U.S. Pat. No. 4,306,522 discloses covering the transfer channels of a two-stroke engine from the outside with covers so that the cylinder can be manufactured in a simple manner in a die casting process. The covers of the transfer channels have projections in order to obtain an advantageous channel geometry. The projections project into the transfer channels and form wall sections thereof. The covers are attached to the cylinder with threaded fasteners. The cylinder bore can become distorted when assembling the covers on the cylinder. This causes an increased wear in the cylinder bore and therefore a deteriorated power of the two-stroke engine.

SUMMARY OF THE INVENTION

It is an object of the invention to provide a method for making a cylinder for a two-stroke engine wherein a cylinder can be manufactured in a simple manner while maintaining the required tolerances.

The method of the invention is for making a cylinder for a two-stroke engine. The cylinder has a wall defining a cylinder outer side and the wall has at least one transfer channel formed therein and a cover closing the transfer channel at the cylinder outer side. The method includes the steps of: mounting the cover on the cylinder; and, machining the cylinder to form a cylinder bore therein.

The covers are mounted to the cylinder in advance of the machining of the cylinder bore. For this reason, a distortion of the cylinder bore, which occurs because of the assembly of the covers, can be compensated during the machining. In this way, there results a high accuracy of the cylinder bore and therewith a running of the piston in the cylinder with less friction and reduced wear.

Advantageously, the cylinder bore is chip machined in the second step. To improve the running characteristics of the piston, the cylinder bore is coated in a third step after the machining. A simple assembly of the cover on the cylinder results when the cover is screwed to the cylinder in the first step. The screw connection can be easily produced and can be well sealed in a simple manner by means of a seal arranged between the cylinder and the cover.

In order to be able to configure the transfer channel with good flow qualities even in a die casting process, a section of the cover projects into a machining region of the cylinder bore after assembly on the cylinder. The section of the cover thereby defines a wall of the transfer channel. The section of the cover is purposefully machined together with the cylinder bore so that the section, after machining, projects up to the cylinder bore without special tolerances having to be maintained for this purpose in the manufacture of the cover. The section of the cover is advantageously coated together with the cylinder bore.

To avoid a transition between the cylinder and the cover at the cylinder bore, and in accordance with a further embodiment of the invention, a section of the cover projects up to a projection of the cylinder bordering at the cylinder bore. The cover thereby ends in a region ahead of the cylinder bore and the cylinder bore is completely delimited by the cylinder itself. Advantageously, the wall of the projection, which borders the transfer channel, is machined in advance of applying the cover. In this way, an optimal shot angle of the transfer channel is obtained. At the same time, a good transition between the section of the cover and the projection is obtained. However, it can also be advantageous that the wall of the projection, which borders on the transfer channel, is machined after mounting the cover. The wall of the projection is especially machined by milling.

The cylinder is made in the die casting process in order to obtain a simple, cost effective manufacture of the cylinder.

BRIEF DESCRIPTION OF THE DRAWINGS

The invention will now be described with reference to the drawings wherein:

FIG. 1 shows a cylinder in longitudinal section with the left-hand side showing the cylinder before machining of the cylinder bore and the right-hand side showing the cylinder after machining of the cylinder bore; and, FIG. 2 is another embodiment of the cylinder also shown in longitudinal section with the left-hand side showing the cylinder before machining of the cylinder bore and the right-hand side showing the cylinder bore after machining.

DESCRIPTION OF THE PREFERRED EMBODIMENTS OF THE INVENTION

FIG. 1 shows a cylinder 1 which is manufactured in the die cast process. The cylinder interior space 6 is delimited by a cylinder bore 3 which is configured coaxially to the cylinder longitudinal axis 2. The cylinder bore 3 is separated from the cylinder outer side 5 by a cylinder wall 4. Cooling ribs 7 are arranged on the cylinder outer side 5 and these cooling ribs are cast as one part with the cylinder 1.

Two transfer channels 9 are configured in the cylinder wall 4. Another number of transfer channels can also be advantageous. Several transfer channels can be closed by a common cover. The transfer channels 9 are separated by a wall section 16 over a segment of their length relative to the cylinder interior space 6. The transfer channels 9 are closed by covers 10 on the cylinder outer side 5.

The covers 10 are screw connected to the cylinder 1 at attachment points 14. The attachment points 14 are arranged in a peripherally-extending flange 13 of the covers 10. The covers 10 have sections 11 which project into the transfer channels 9 and these sections 11 extend from the covers 10 into the cylinder interior space 6, that is, up to the cylinder bore 3. The sections 11 each form a roof 15 of a transfer channel 9. The sections 11 can, however, also form another wall section of a transfer channel 9.

In the manufacture of the cylinder 1, the base body of the cylinder 1 is first cast in a die cast method. Thereafter, the covers 10 are screw connected to the cylinder 1 at the attachment points 14. In the screwed-on state, the covers project with their sections 11 into the cylinder bore 3. The cylinder 1 has a machining region 8 which is shown in FIG. 1 on the left-hand side of the cylinder 1. After the assembly of the covers 10, the machining region 8 of the cylinder bore 3 is machined. The machining takes place especially with a cutting method. The section 11 of the covers 10 is machined together with the cylinder bore 3 up to the final diameter (d) of the cylinder bore 3. On the right side of FIG. 1, the cylinder 1 is shown after the machining. After the machining of the cylinder bore 3, the cylinder bore together with the sections 11 of the covers 10 can be coated. The sections 11 project up to the cylinder bore 3.

FIG. 2 shows an embodiment of a cylinder 21. The cylinder 21 includes a cylinder interior space 26 which is delimited by the cylinder bore 23 arranged coaxially to the cylinder longitudinal axis 22. The cylinder wall 24 delimits the cylinder interior space 26 in the direction toward the cylinder outer side 25. Cooling ribs 27 are arranged on the cylinder outer side 25. The cylinder 21 includes two transfer channels 29 which are closed by covers 30 to the cylinder outer side 25. The covers 30 are connected at their flanges 33 to the cylinder 21 at attachment points 34. The covers 30 include sections 31 which project from the cover 30 in a direction toward the cylinder bore 23 and form the roof 35 of the transfer channels 29. The section 31 ends at a spacing (e) ahead of the machining region 28 of the cylinder bore 23. The section 31 lies against a projection 32 of the cylinder 21. The projection 32 delimits the cylinder bore 23 and has a wall 36 which delimits the roof 35 of the transfer channel 29.

In the manufacture of the cylinder 21, the cylinder 21 is first manufactured in the die casting process. Thereafter, the walls 36 of the projections 32 are machined, for example, by milling. The desired shot angle of the transfer channels 29 can be adjusted by the machining. After the machining, the covers 30 are screw connected to the cylinder 21 at the attachment points 34. Thereafter, the cylinder bore 23 is machined up to the final diameter (d). After the machining, the section 31 of the cover 30 has a distance to the cylinder bore 23 and is disposed behind the projection 32 and lies thereagainst as shown in the right-hand side of FIG. 2.

It can be advantageous that the wall 36 is machined after the assembly of the cover 30. The wall 36 delimits the transfer channel 29. An inner contour machining follows with which the transition of the cylinder 21 to the cover 30 at the transfer channel 29 is advantageously machined, that is, especially the transition of the section 31 to the projection 32.

It is understood that the foregoing description is that of the preferred embodiments of the invention and that various changes and modifications may be made thereto without departing from the spirit and scope of the invention as defined in the appended claims.

What is claimed is:

1. A method for making a cylinder for a two-stroke engine, the cylinder defining a cylinder bore to be machined and having a wall defining a cylinder outer side and said wall having at least one transfer channel formed therein and a cover closing said transfer channel at said cylinder outer side, the method comprising the steps of:

mounting said cover on said cylinder;

machining said cylinder bore; and, wherein said cover has a section which projects into a machining region of said cylinder bore after placement on said cylinder; and, said method comprises the further step of machining said section together with said cylinder bore up to a final diameter (d) of said cylinder bore.

2. The method of claim 1, wherein said cylinder bore is machined by chip cutting.

3. The method of claim 1, comprising the further step of coating said cylinder bore after machining said cylinder.

4. The method of claim 1, wherein said cover is mounted on said cylinder with threaded fasteners.

5. The method of claim 1, wherein, after machining said cylinder bore and said section of said cover, said method comprises the further step of coating said section of said cover, which projects up to said cylinder bore, together with said cylinder bore.

6. The method of claim 1, wherein said method comprises the further step of making said cylinder in a die casting process.

* * * * *